United States Patent [19]

Osaki

[11] Patent Number: 5,685,552
[45] Date of Patent: Nov. 11, 1997

[54] COLLAPSIBLE LUGGAGE CARRIER

[76] Inventor: Sam Osaki, 1468 Sheffield Dr., Campbell, Calif. 95008

[21] Appl. No.: 425,295

[22] Filed: Apr. 20, 1995

[51] Int. Cl.$^6$ .................................................... B62B 1/00
[52] U.S. Cl. ........................ 280/47.24; 280/37; 280/646
[58] Field of Search .............................. 280/37, 646, 42, 280/655, 47.2, 47.24, 47.33

[56] References Cited

U.S. PATENT DOCUMENTS

| | | | |
|---|---|---|---|
| 1,747,600 | 2/1930 | Reardon | 280/47.33 |
| 2,249,123 | 7/1941 | Fleck et al. | 280/41 |
| 2,293,460 | 8/1942 | Friend | 280/47.33 |
| 2,629,607 | 2/1953 | Roubeck | 280/42 |
| 2,639,162 | 5/1953 | Schon | 280/42 |
| 2,647,762 | 8/1953 | Jamieson et al. | 280/41 |
| 2,668,721 | 2/1954 | Wright | 280/42 |
| 2,743,115 | 4/1956 | Rutledge | 280/42 |
| 2,812,950 | 11/1957 | Holloway | 280/42 |
| 2,914,336 | 11/1959 | Hibben, Jr. et al. | 280/42 |
| 3,197,226 | 7/1965 | Erlinder | 280/36 |
| 4,128,252 | 12/1978 | Raniero | 280/40 |
| 4,294,463 | 10/1981 | Kotani | 280/646 |
| 4,759,559 | 7/1988 | Moulton | 280/40 |
| 4,781,397 | 11/1988 | Burn | 280/655 |
| 4,867,438 | 9/1989 | Steckert et al. | 280/47.2 |
| 4,878,682 | 11/1989 | Lee | 280/42 |
| 5,242,189 | 9/1993 | Osaki | 280/645 |

FOREIGN PATENT DOCUMENTS

| | | | |
|---|---|---|---|
| 211976 | 4/1960 | Austria | 280/42 |
| 951982 | 11/1949 | France | 280/47 |

Primary Examiner—Brian L. Johnson
Assistant Examiner—Jonathan E. Butts
Attorney, Agent, or Firm—Carol D. Titus; Gregory Scott Smith; Leary, Titus & Aiello

[57] ABSTRACT

A collapsible wheeled luggage carrier having a collapsible center structure, a handle, a pair of luggage support wings, wheels, and a kickstand. The luggage support wings when in the extended position are in the same plane on each side of the center structure and including a plurality of wing members lying perpendicular to and pivotally secured at one end to the center structure, and pivotally secured at the other end to wing end members. Foldable diagonal locking members are pivotally connected to the wing members on the center structure to hold the wings in the open position. A kickstand is pivotally attached to the center structure and having a cross brace communicating between the center structure and the kickstand. A carrying collar adjustably secured to the center structure including a strap the luggage is suspended from and supported in place by the luggage support wings. The collapsible luggage carrier is foldable to a small size and storable in a pouch which is carryable in the fold of a garment bag. The luggage carrier as described is especially useful for carrying floppy luggage such as garment bags because the luggage us suspended rather than supported from below.

18 Claims, 8 Drawing Sheets

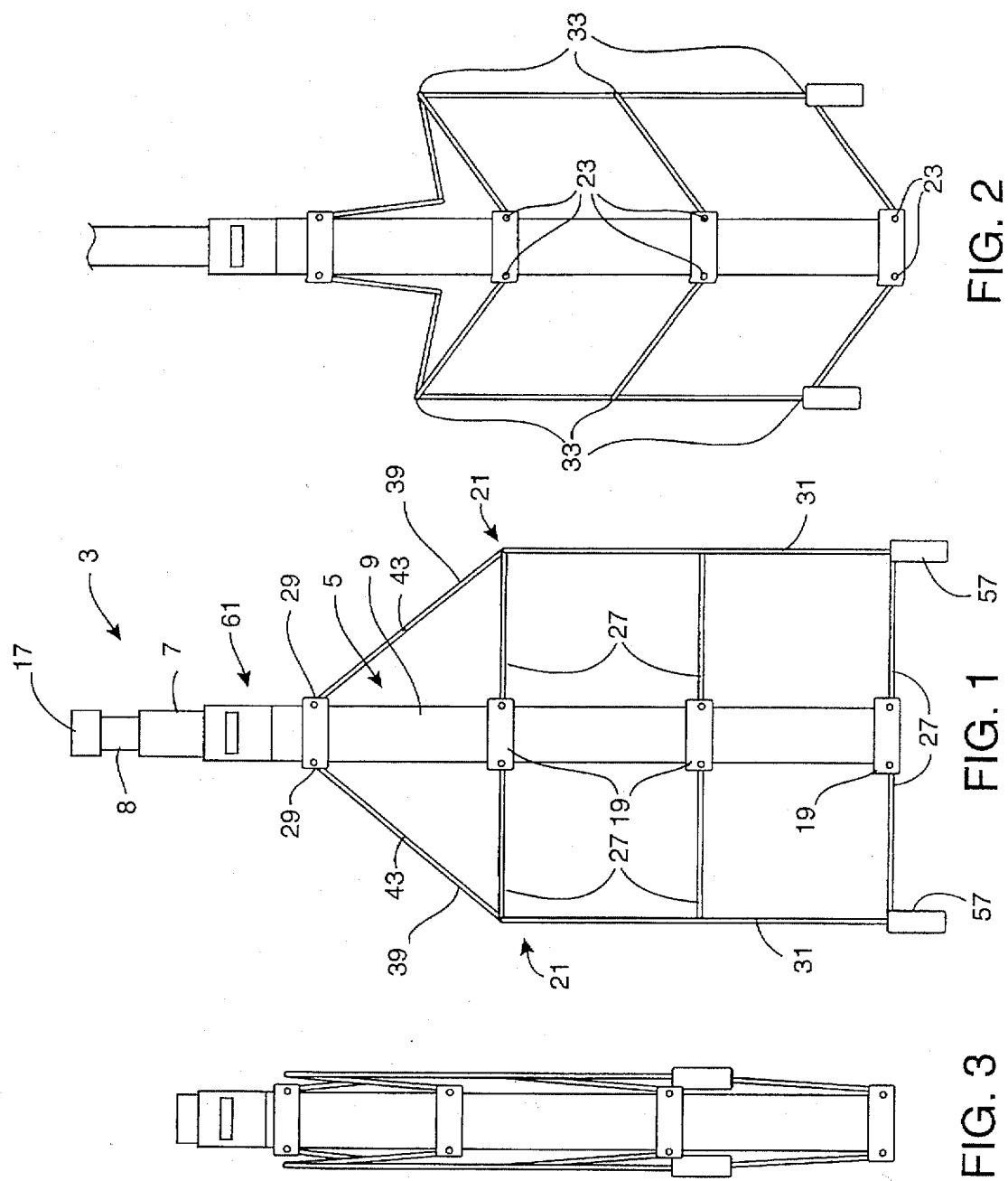

COLLAPSIBLE LUGGAGE CARRIER

BACKGROUND OF THE INVENTION

1. Field of the Invention

The present invention relates to luggage carriers. In particular, the present invention relates to foldable, multipurpose, wheeled luggage carriers, suitable for use by airline passengers, capable of transporting suitcases, bags, garment bags, self supporting garment bags, and the like.

2. Description of the Prior Art

There are currently many conventional means of transporting luggage. The traveler has the choice of hand-held luggage such as suitcases, "carry-on" bags, garment bags, etc. Each of these can be heavy, cumbersome, and difficult to carry, particularly if several articles of luggage are being carried at one time.

In the past various collapsible wheeled hand trucks, or luggage carriers, have been devised. For the most part however, these hand trucks are unnecessarily complicated, or are too bulky, for use by airline passengers who may wish to take the hand truck on board the plane with the carry-on luggage.

For example Kazmart U.S. Pat. No. 3,612,563 (1971), discloses a carrier which can be compacted to the form of a bundle when disassembled. However, this carrier is cumbersome to handle since the carrier must be assembled for use, and disassembled for storage. Further, the device is not satisfactory for carrying luggage of low rigidity, such as a garment bag, because the luggage is primarily supported at the bottom by a restraining strap.

SUMMARY OF THE INVENTION

The general object of the present invention is to provide a novel, lightweight, foldable luggage carrier which is simply and economically constructed, and easy to manufacture.

Another objective of the present invention is to provide a luggage carrier which is lightweight, highly portable, and is easily and compactly collapsed for easy storage or carrying, but which is sufficiently large, when extended to operating position, to carry a large load.

Another object of the invention is to provide a luggage carrier which is usable for luggage of low rigidity, particularly luggage such as garment bags, and is also capable of carrying accessory bags fixed to the luggage carrier and lying on top of the garment bag.

These and other objects of the invention will be apparent to those skilled in the art from the detailed description of a preferred embodiment of the invention below.

The present invention provides a wheeled luggage carrier which is collapsible for easy use and transport by travelers. The present invention, in one preferred embodiment, comprises a collapsible wheeled luggage carrier having a handle pivotally secured to a collapsible center structure, a foldably coupled pair of luggage support wings lying in substantially the same plane, wheels secured to the lower portion of the luggage support wings, a kickstand, and a luggage fastening means.

The center structure, in a preferred embodiment, can be telescopically collapsed, and includes a handle pivotally coupled to an upper portion of the center structure, and a fixing means for holding the telescopic center structure at pre-determined settings in the extended position.

A pair of luggage support wings lying in substantially the same plane as the center structure are foldably coupled to the center structure. In a preferred embodiment the luggage support wings comprise a plurality of wing members lying substantially parallel and pivotally coupled to the center structure at one end of the wing members, and pivotally coupled to wing end members at another end of the wing members. The luggage support wings also include a pair of diagonal foldable locking members coupled at one end to the center structure and at another end to the end wing members. The locking members are foldable at a middle hinged portion for storage, and lockable at full extension to hold the luggage support wings in the extended position for use. The luggage carrier includes wheels fixed to a lower end of each of the wing end members.

Standing means are provided in a preferred embodiment by a kickstand which is pivotally coupled at one end to the center structure, and held in the open or standing position by a foldable cross brace communicating between the kickstand and the center structure.

A carrying collar is adjustably attached to the center structure. Secured to the carrying collar is a luggage fastening means, which in a preferred embodiment comprises a carrying strap whereby an article of luggage is held on the luggage carrier by the carrying strap and carrying collar, and hangs below the luggage strap and carrying collar, and is supported in place by the luggage support wings.

Without disassembly, the luggage carrier is collapsible into a compact bundle by collapsing the center structure, releasing the locking members so that the luggage support wings can fold upward against the center structure, and folding the handle.

The luggage carrier may be provided with a carrying case or pouch and stowed in the collapsed position in the carrying pouch. In a preferred embodiment, the collapsed luggage carrier when packed in its pouch may be held in the fold of a garment bag by means for removably attaching the pouch to the garment bag, such as snaps or hooks.

BRIEF DESCRIPTION OF THE DRAWINGS

A preferred embodiment of the present invention is further described in connection with the accompanying drawings, in which:

FIG. 1 shows an elevation view of the carrier in its completely open position.

FIG. 2 shows an elevation view of the carrier with its luggage support wings partially folded.

FIG. 3 shows an elevation of the carrier in its completely folded position.

DETAILED DESCRIPTION OF THE PREFERRED EMBODIMENT

Reference will now be made in detail to a presently preferred embodiment of the invention as illustrated in the accompanying drawings.

Figure 11A:
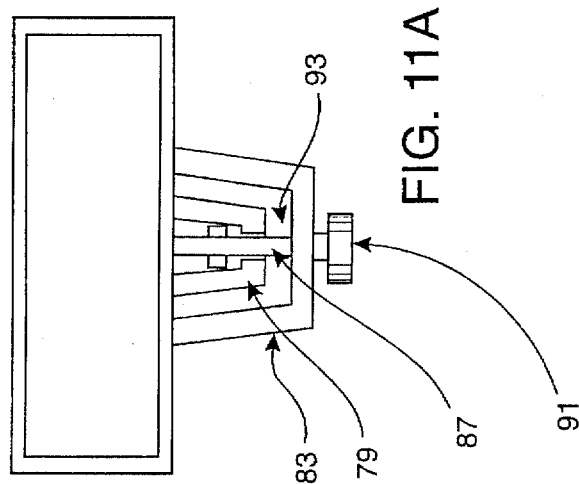
FIGS. 11A & B shows a rear quarter view of a lower portion of the center structure with the kickstand in operating position.
Figure 11B:
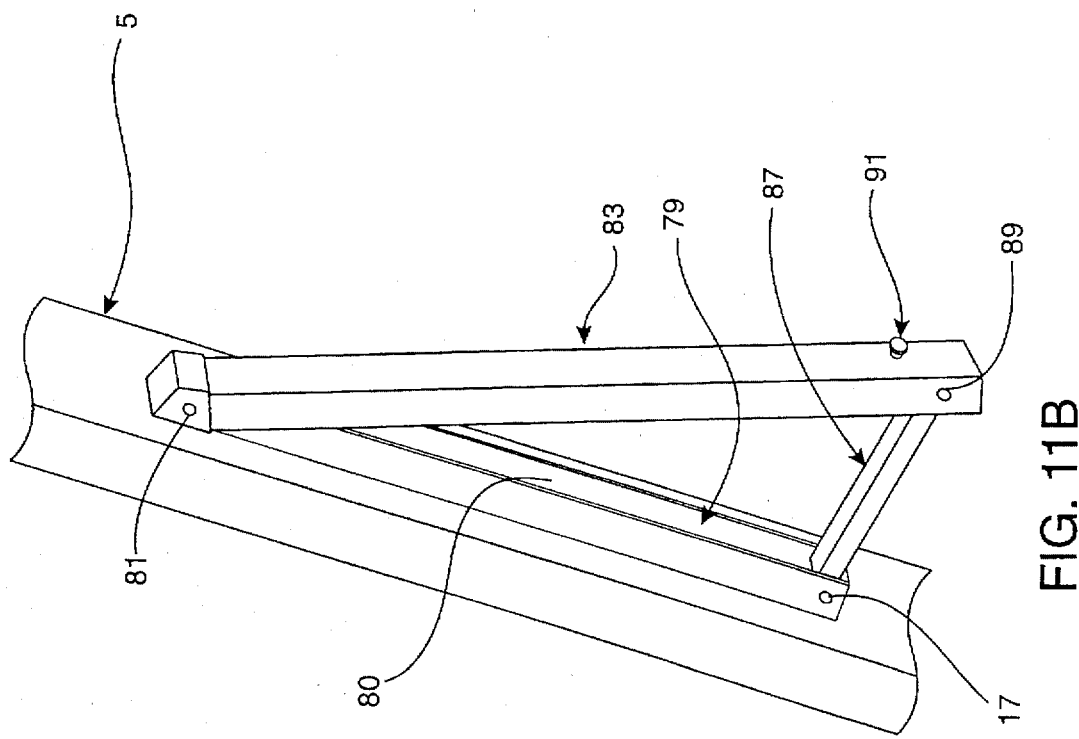
FIG. 11C shows a second embodiment of the kickstand.

In FIG. 1 the collapsible wheeled luggage carrier 3 is shown having a collapsible center structure 5, which in a preferred embodiment is telescopic, having an upper center post 7, and a hollow lower center post 9 having a larger diameter than the upper center post 7. The shape of the center structure is preferably a square cross-section tube. Alternatively, round or channel shaped tubing may be used. In another preferred embodiment, not shown, the center structure may include a plurality of intermediate hollow center posts, each having a larger diameter than the intermediate hollow center post above it. FIG. 1 shows center structure 5 with one intermediate hollow center post 8. The center structure 9 has fixing means 11, best seen in FIGS. 4, 8, and 11, which will adjustably fix the upper center post in extended position at discrete pre-determined settings, comprising a plurality of holes 13 in one side of the upper center post, and a pin 15 in the hollow lower post 9, whereby the pin 15 which when aligned with any one of holes 13 can engage any one of holes 13, to fix the extension of upper center post 7 at the desired height. Holes 13 can be on any side of the upper center post.

Figure 4:
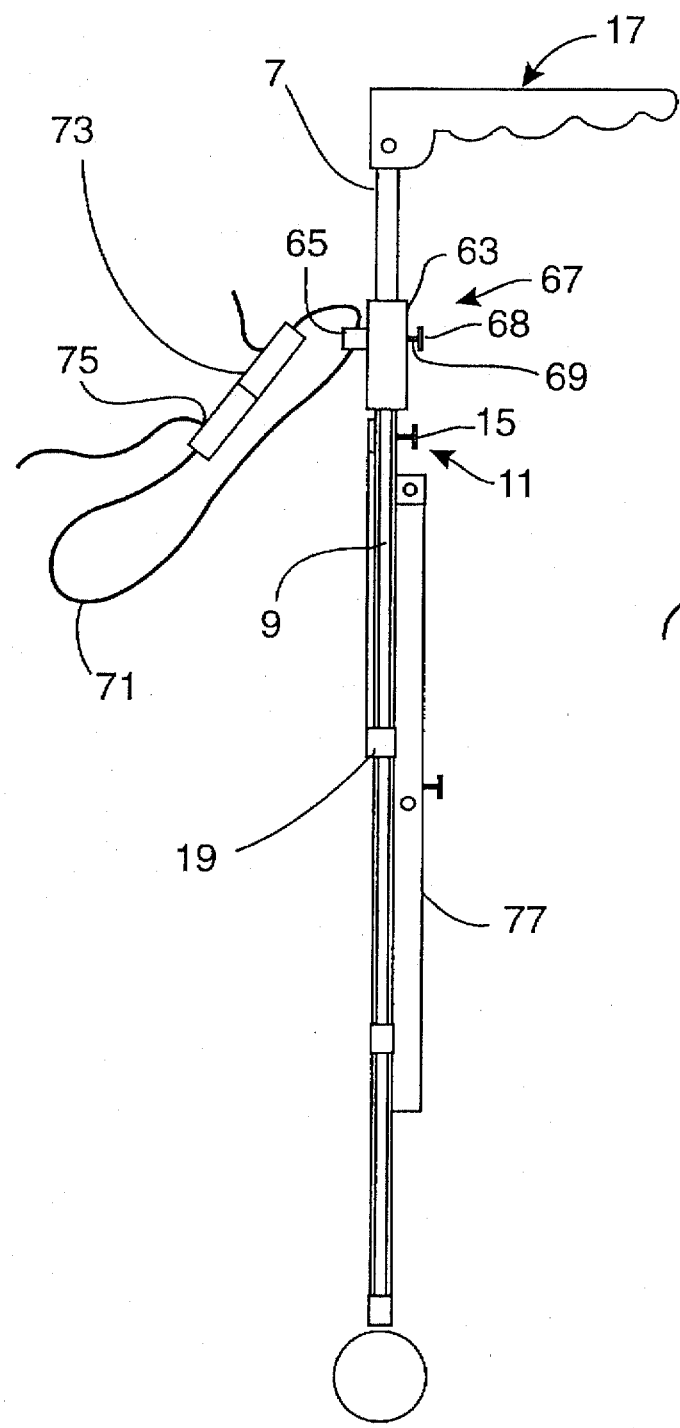
FIG. 4 shows a side view of the carrier in its open position with handle up, carrying strap attached to the carrying collar, and the kickstand in its closed position.
Figure 5:
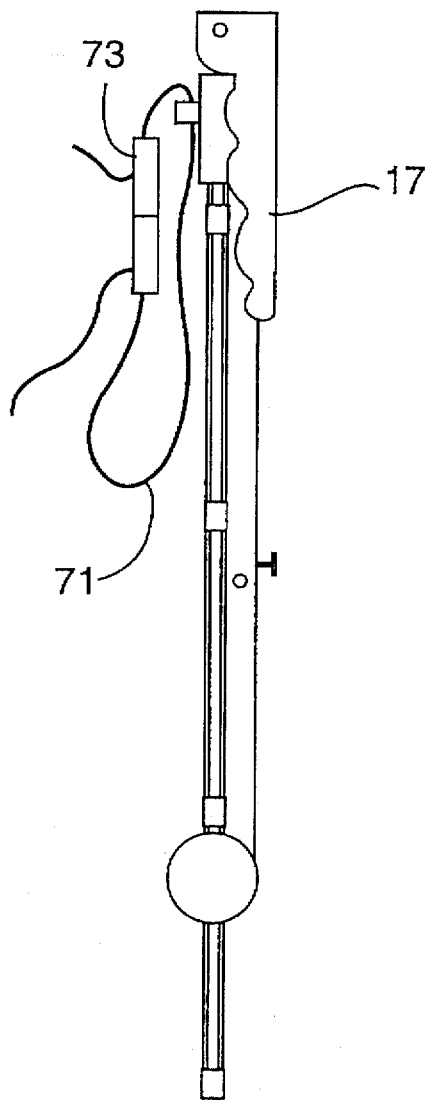
FIG. 5 shows a side view of the carrier in its completely folded position.
Figure 9:
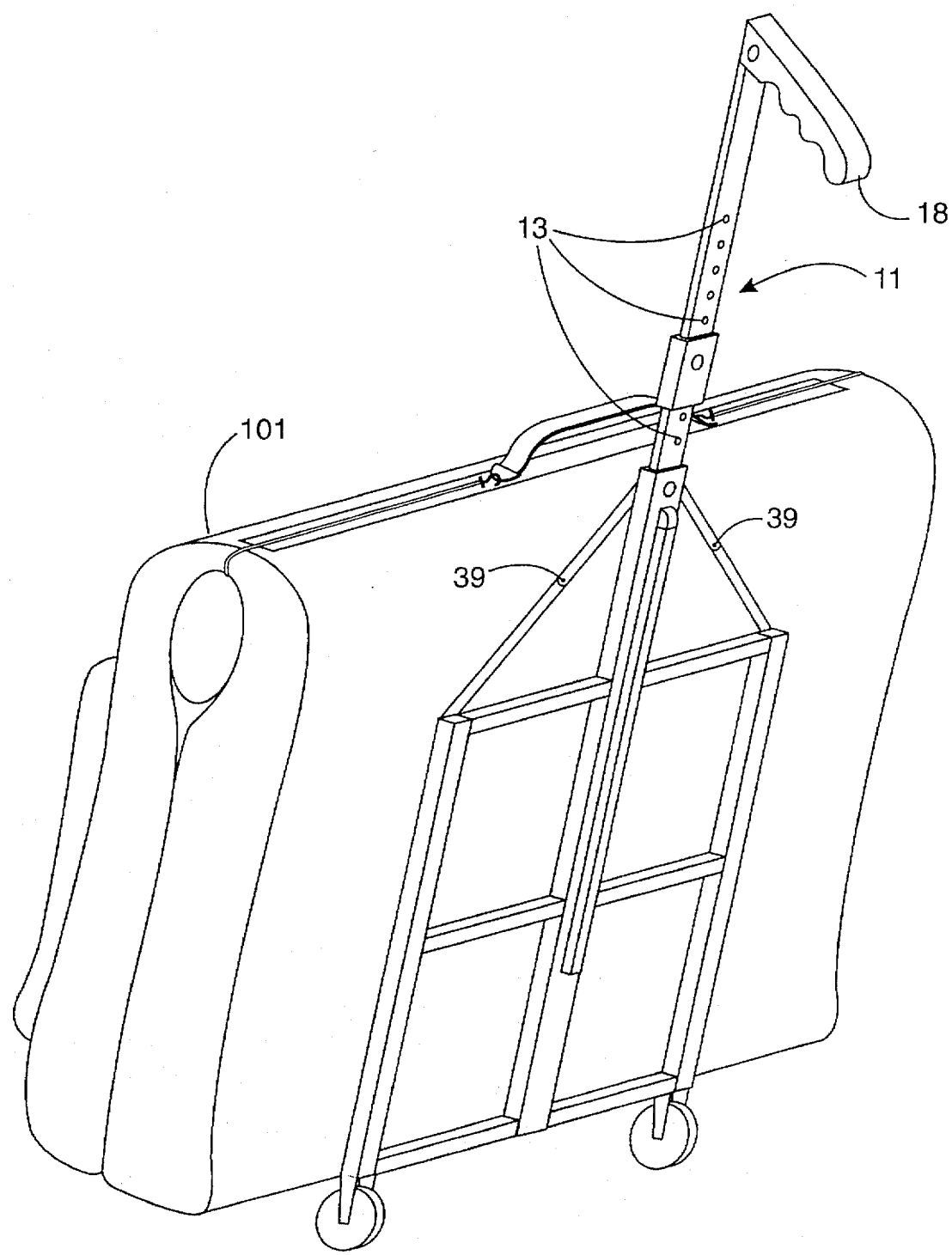
FIG. 9 shows a rear quarter view of the carrier with the kickstand in its closed position.

Pivotally mounted at 16 to the upper center post 7 is handle 17, best seen in FIGS. 4 and 5. The handle is swingable between the stored position illustrated, and an operating position. A channel 18, best seen in FIG. 9, is formed in the back of handle 17 having a larger width than center structure 5. In the folded position the center structure will lie within the channel of handle 17. The lower center post 9 of center structure 5 has a plurality of mounting plates 19 mounted thereon.

Luggage support wings 21 lying in substantially the same plane are pivotally coupled to center structure 5 at pivot points 23 on mounting plates 19. In a preferred embodiment the luggage support wings 21 comprise a plurality of wing members 27 pivotally coupled at a first end to the center structure 5 at pivot points 23 on mounting plates 19. In a preferred embodiment, mounting plates 19 have holes which are aligned with a hole at one end of each wing member 27 to receive pins, thereby allowing the wing members 27 to pivot upward into the folded position. In their extended position as seen in FIG. 1, wing members 27 lie substantially perpendicular to and extending outward from center structure 5, and are pivotally coupled to wing end members 31 at pivot points 33. In a preferred embodiment, wing members 27 have holes in the outer end which are aligned with holes in the wing end member to receive pins, whereby wing members 27 may pivot in relation to wing end members 31 when folding the luggage carrier 3 for storage. In another possible configuration, wing members 27 may have a channel formed in the bottom of the wing members 27 for partially receiving wing end members 31 when luggage support wings are in the folded position. A pair of diagonal foldable locking members 39 are pivotally secured at one end to the uppermost mounting plate, and at another end to the upper end of the wing end members 31 at pivot point 29. Diagonal foldable locking members 39 preferably include a known locking means, not shown, at pivot joint 43.

Figure 10:
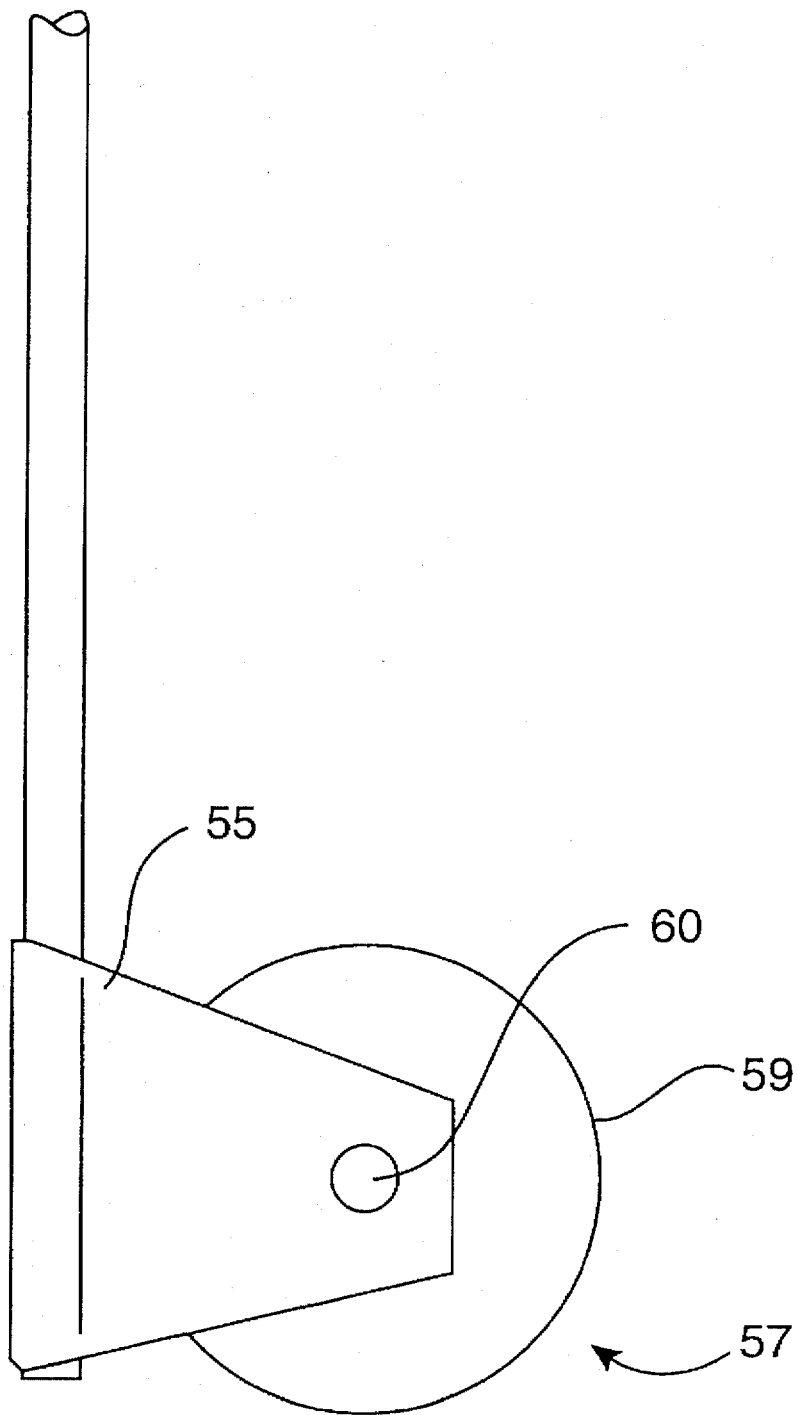
FIG. 10 shows a side view of the wheel configuration.

Referring to FIG. 10, wheel assembly 57 comprises a U-shaped member 55 fixed to the lower portion of wing end member 31. The wheel assembly 57 further includes wheels 59 rotatably coupled to each arm of the U-shaped member 55 by wheel shaft 60. This embodiment prevents any possibility of the wheels 59 rubbing against any luggage 101 loaded on the luggage carrier 3. Also, if the user loads the luggage carrier 3 laying flat, the wheels 59 in this configuration provide a more stable platform.

Adjustable carrying collar 61 comprises a hollow ring-shaped collar 63 of larger diameter than the upper center post 7, and having a ring 65 and an adjusting means 67. The adjusting means 67 comprises a hole 69 in carrying collar 63 which aligns with the holes 13 in upper center post 7, and a pin 68 which lies in hole 69 that can engage any of holes 13, thereby fixing the height of the carrying collar 61 on upper center post 7. An adjustable carrying strap 71 is threaded through ring 65 having a buckle or other known fastening means 73 and known adjusting means 75 means for adjusting the length of the carrying strap 71.

A kickstand assembly 77 includes a kickstand 83 pivotally attached to center structure 5 at pivot joint 81. Kickstand 83 is an elongate member having a channel 93 formed in its back and a knob 91 fixed to its front. The channel 93 is of greater width than slide track 79. In folded position slide track 79 will be substantially received within channel 93. A slide track 79 having a channel 80 is fixed to center structure 5 with the top of the slide track 79 in substantial proximity to pivot joint 81 and lying in the same axis as kickstand 83. Cross brace 87 is pivotally coupled at a first end to kickstand 83 at pivot joint 89. The second end is slidably received within channel 80 of slide track 79 when the kickstand assembly is in the open position. In the closed position, the second end of cross brace 87 slides upward in channel 80 until cross brace 87 is completely received within channel 80 of slide track 79.

Figure 11C:
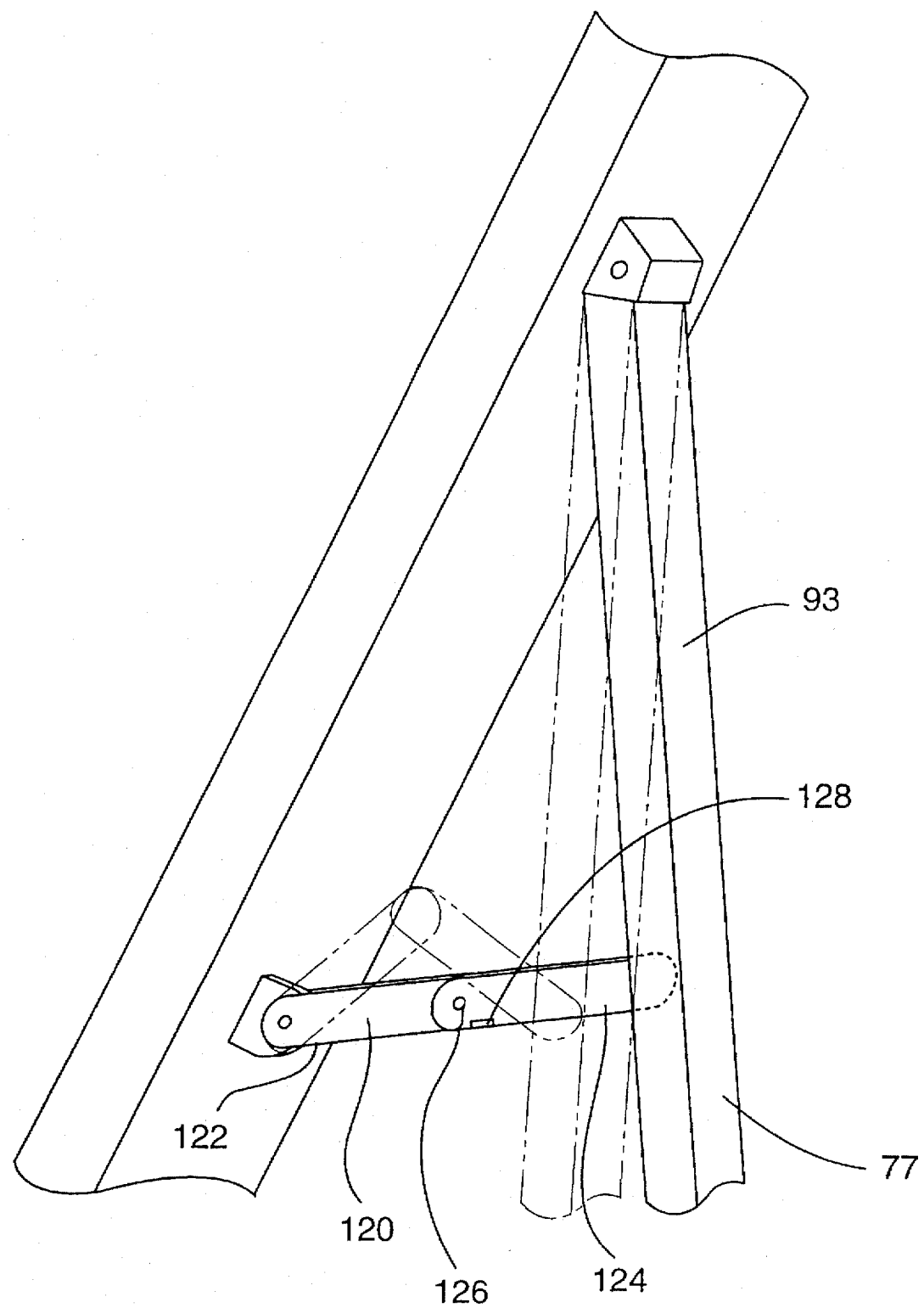

A second embodiment of the kickstand assembly 77, shown in FIG. 11C, has the same channel 93 as the first embodiment. However, in this embodiment, the cross brace 120 is formed of two pieces 122, 124 that are pivotally attached at the middle 126 of the cross brace 120. A locking means 128, in this case a detent, is provided to hold the cross brace 120 in the open position when desired. When the kickstand 83 is closed, the cross brace 120 folds in half at the pivot point 126 and fits within the channel 93. This protects the cross brace 120 and provides a sleek and aesthetically pleasing exterior while the luggage carrier 3 is in use.

FIG. 2 shows the luggage carrier 3 partially collapsed with luggage support wings 21 partly folded. When it is desired to collapse the luggage carrier for storage, it is a simple matter to manually unlock the locking means at pivot joint 43 on the diagonal foldable locking members 39, then fold the luggage support wings 21 upward, and collapse the center structure 5. As is shown, pivot joints 23 and 33 allow the upward pivoting and hinged movement of the wing members 27, and of the wing end members 31, while diagonal foldable locking members 39 fold downwardly at pivot joint 43. Extending carrier 3 to its operational position is simply the reverse of the steps described above.

FIG. 3 shows the luggage carrier 3 completely collapsed, with luggage support wings 21 in folded position against center structure 5. Telescopic center structure 5 is collapsed with handle 17 in folded position with the center structure 5 lying within the channel 18 of handle 17.

Figure 6:
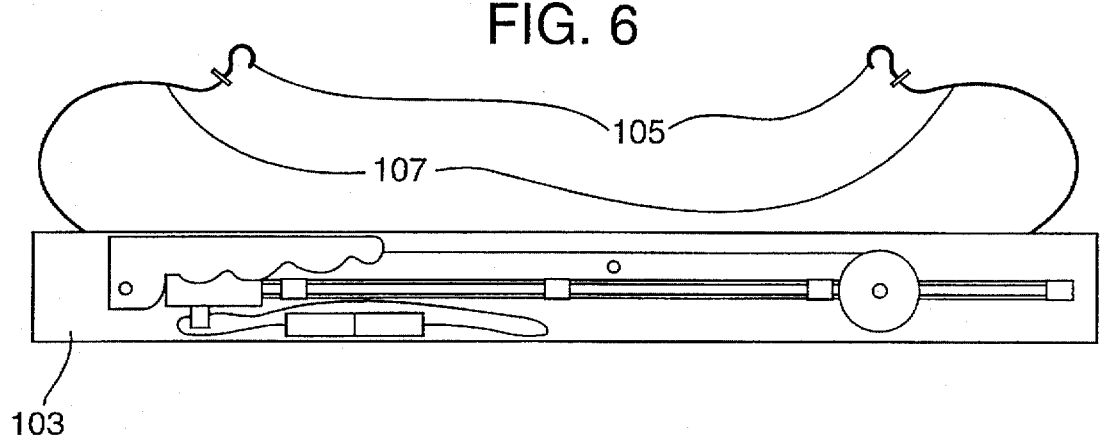
FIG. 6 shows a carrier stored in its carrying pouch, the pouch has adjustable cords to attach to the "D" rings on or near the bag's carrying handle or shoulder strap.
Figure 7:
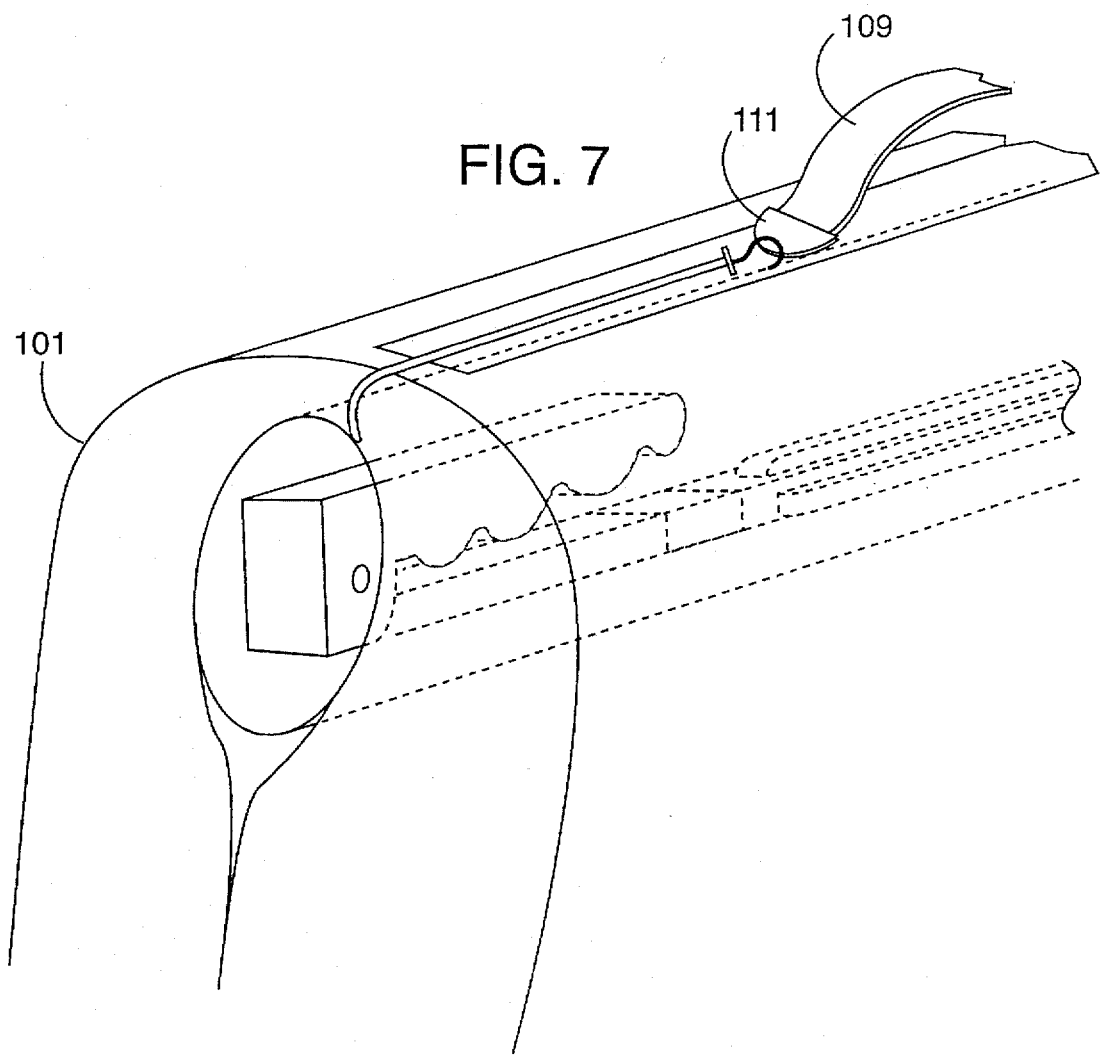
FIG. 7 shows the luggage carrier stored within its carrier pouch and secured within the fold of the garment bag by the adjustable cords.

Referring to FIG. 6 the fully collapsed luggage carrier can be seen stored in carrying pouch 103. In the embodiment shown, the carrying pouch 103 has hooks 105 coupled to the ends of elastic bands 107. As seen in FIG. 6, in this embodiment, the collapsed luggage carrier 3 in its pouch 103 can be stored in the fold of garment bag 101, best seen in FIG. 7, and removably attached thereto by means of hooks at the ends of elastic bands 107 attached to the "D" rings 111 of garment bag handle 109. Alternatively, pouch 103 may be removably attached to garment bag 101 by means of hooks 105 attached directly to handle 109 of garment bag 101.

Figure 8:
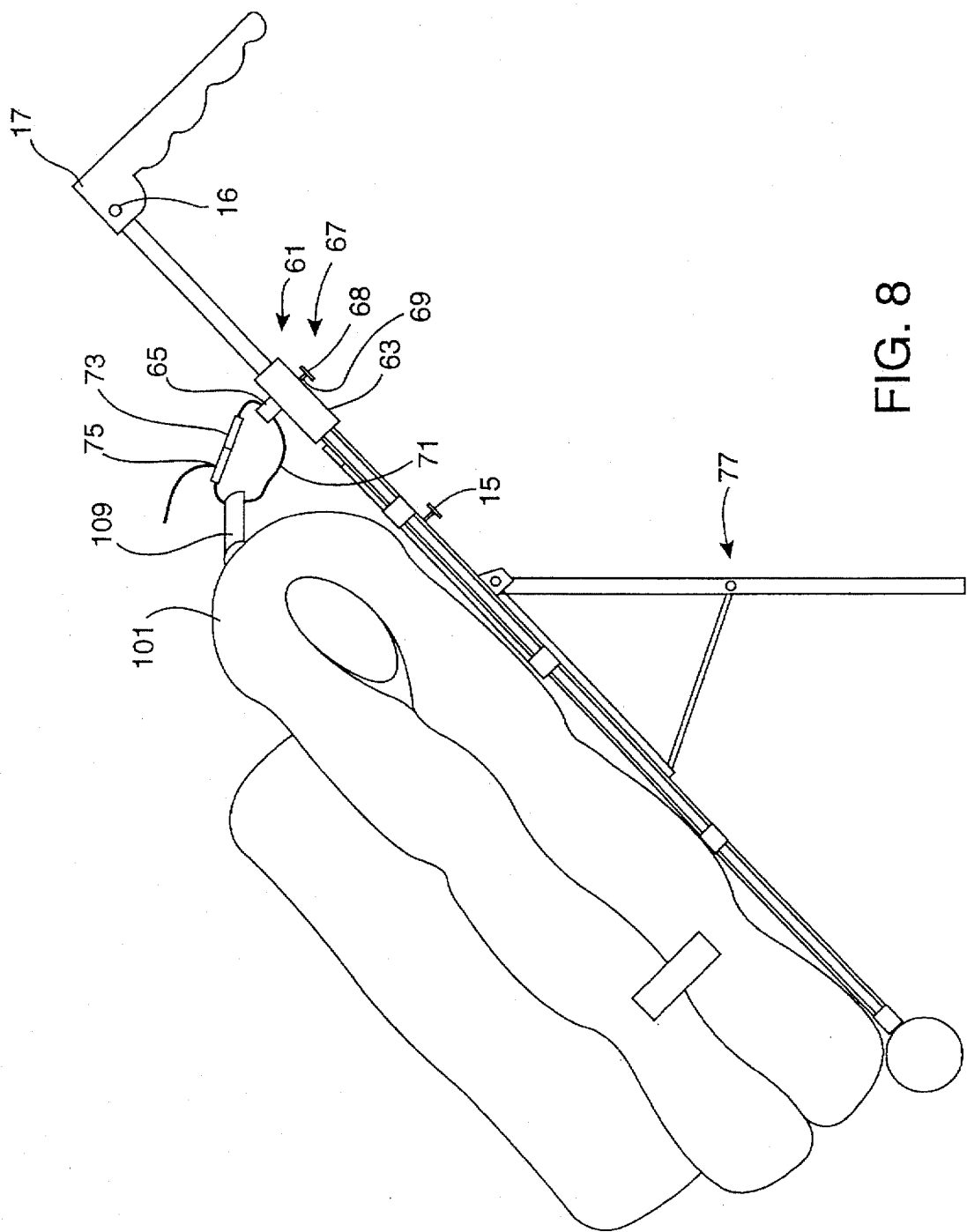
FIG. 8 shows the luggage carrier fully deployed with the garment bag loaded and secured to the adjustable carrying collar, and with the kickstand fully deployed.

Referring now to FIG. 8 luggage carrier 3 is shown fully extended and in operation. In operation, luggage carrier 3 is easy and convenient to transport, store, and use. FIG. 8 shows luggage carrier 3 means of garment bag 101 secured by means of carrying strap 71. Luggage carrier 3 also conveniently carries and transports suitcases, bags, brief cases and the like.

The material used to construct the luggage carrier 3 is preferably anodized aluminum. Alternatively, high strength plastic or fiber reinforced plastic, made by extrusion or injection molding or a combination thereof, may be used.

While the above description contains many specificities, the examples given should not be construed as limitations on the scope of the invention, but merely as exemplifications of preferred embodiments thereof. Additional advantages and modifications will readily occur to those skilled in the art. The invention in its broader aspects is therefore not limited to the specific details, representative apparatus and illustrative examples shown and described. Accordingly, it should be apparent to those skilled in the art that variations and modifications are possible without departing from the spirit of the invention.

What is claimed is:

1. A collapsible wheeled luggage carrier comprising:
    a collapsing center structure having a handle secured thereto;
    a pair of luggage support wings having a bottom and lying in substantially the same plane on opposite sides of said center structure and foldably coupled to said center structure;
    a plurality of wheels rotatably coupled to said bottom of said luggage support wings;
    a carrying means for removably attaching luggage to said luggage carrier, said carrying means being coupled to said center structure, said carrying means comprising an adjustable carrying collar having a hollow collar of a larger diameter than an upper portion of said center structure, and having a ring for receiving an adjustable carrying strap, and an adjusting means for adjusting the height of said carrying collar relative to said center structure.

2. The luggage carrier of claim 1 wherein said luggage support wings comprise a plurality of wing members lying substantially parallel, said wing members being pivotally coupled at a first end to said center structure, and pivotally coupled at a second end to an end member, said wing end member having upper and lower ends, and said luggage support wings further comprising locking means for holding said luggage support wings in an extended position; and whereby luggage is removably attached to said luggage carrier by said carrying means and the luggage hangs below said carrying means and is supported by said luggage support wings.

3. The luggage carrier of claim 1 wherein said handle assembly includes a handle having a front and a back, and said handle is foldably coupled to said top of said center structure, said back of said handle having a channel formed therein, said channel having a larger width than said center structure, whereby said handle may be downwardly folded and said center structure received within said channel.

4. The luggage carrier of claim 1 wherein said adjusting means comprises a hole formed in said carrying collar which aligns with holes formed in said center structure at discrete intervals, and a pin slidably received in said hole in said carrying collar, whereby said pin can engage any of said holes in said center structure, thereby fixing the height of said carrying collar relative to said center structure at predetermined settings.

5. The luggage carrier of claim 2 wherein said wheel assembly comprises a U-shaped member, having two arms, fixed to said lower portion of said wing end member, said wheel assembly further including a wheel rotatably coupled to each arm of said U-shaped member by a wheel shaft.

6. The luggage carrier of claim 2 wherein said luggage support wings further comprise mounting plates fixed to said lower portion of said center structure.

7. The luggage carrier of claim 1 wherein said center structure is telescopic having an upper center post, and a hollow lower center post, corresponding with said lower portion of said center structure, having a diameter larger than said upper center post.

8. The luggage carrier of claim 1 wherein said center structure is telescopic having an upper center post, a hollow intermediate center post having a diameter larger than said upper center post, and a hollow lower center post, corresponding with said lower portion of said center structure, having a diameter larger than said intermediate center post.

9. The luggage carrier of claim 1 wherein said telescopic center structure further comprises a fixing means for fixing the extension of said upper center post relative to said hollow lower center post.

10. The luggage carrier of claim 9 wherein said fixing means comprises a plurality of holes formed in one side of said upper center post, a hole formed in said hollow lower center capable of aligning with any of said holes formed in said upper center post, and a pin received in said hole in said hollow lower center post, whereby said pin when aligned with any one of said holes in said upper center post can engage any one of said holes in said upper center post to fix the extension of said upper center post relative to said hollow lower center post.

11. The luggage carrier of claim 2 wherein said locking means comprises a pair of foldable diagonal locking members pivotally coupled to said center structure above said wing members, and pivotally coupled at a second end to said upper end of said wing end members.

12. The luggage carrier of claim 1 further comprising a kickstand pivotally coupled at a first end in substantial proximity to said first end of said locking members, and a cross brace foldably coupled between said center structure and said kickstand.

13. A collapsible wheeled luggage carrier comprising:
    a telescopic center structure, having an upper center post, having a top, and a hollow lower center post, having a diameter larger than said upper center post, said upper center post being slidably received within said hollow lower center post, said top of said upper center post having a handle foldably secured thereto, said handle having a front and a back, said back of said handle having a channel formed therein, said channel having a larger width than said center structure, whereby said handle may be downwardly folded and said center structure received within said channel;
    a pair of luggage support wings lying in substantially the same plane on opposite sides of said center structure and foldably coupled to said hollow lower center post of said center structure at a plurality of mounting plates fixed to said hollow lower center post of said center structure, said luggage support wings comprising a plurality of wing members lying substantially parallel, said wing members being pivotally coupled at a first end to said mounting plates, and pivotally coupled at a second end to a vertical portion of a wing end member, said luggage support wings further comprising locking means for holding said luggage support wings in extended position, said locking means comprising a pair of foldable diagonal locking member pivotally coupled to said center structure above said wing members, and pivotally coupled at a second end to said upper end of said wing end member;

a wheel assembly comprising an L-shaped wing end member having a horizontal portion and a vertical portion lying in a given plane, said horizontal portion of said wing member being bent substantially 90 degrees from said plane of said vertical portion, and further comprising a wheel rotatably-coupled by means of a shaft to said horizontal portion of said wing end member;

a carrying means coupled to said center structure, comprising an adjustable carrying collar having a hollow collar of a larger diameter than said upper portion of said center structure, and having a ring for receiving an adjustable carrying strap, and an adjusting means for adjusting the height of said carrying collar relative to said center structure, said adjusting means comprising a hole formed in said carrying collar for receiving a pin which is alignable with a plurality of holes formed in said upper post of said center structure, whereby said pin can engage any of said holes in said center structure, thereby fixing the height of said carrying collar relative to said center structure; a kickstand pivotally coupled at a first end in substantial proximity to said first end of said locking members, and a cross brace foldably communicating between said center structure and said kickstand; whereby luggage is removably attached to said luggage carrier by said carrying means and the luggage hangs below said carrying means and is supported by said luggage support wings.

14. In combination:

a piece of luggage having a carrying means, and a collapsible, wheeled luggage carrier comprising:
 a luggage holder,
 a handle attached to said luggage holder,
 a plurality of wheels rotatably coupled to said luggage holder, and an adjustable carrying collar attachable to said luggage holder, and having a ring for receiving a carrying strap, and an adjusting means for adjusting the height of said carrying collar relative to said luggage holder, said adjustable carrying collar configured to suspend said piece of luggage by said carrying means said luggage carrier having a first position and a second position, wherein in said first position said luggage carrier is extended and is adapted to hold said piece of luggage, and wherein in said second position said luggage carrier is collapsed and is detachably attached to said piece of luggage.

15. The combination of claim 14 wherein said piece of luggage is a garment bag, and wherein in said second position said luggage carrier is located within a fold of said garment bag.

16. The combination of claim 15 further comprising a pouch, said pouch being located within said fold of said garment bag, and wherein said luggage carrier may be inserted and removed from said pouch while said garment bag is folded.

17. The combination of claim 14 further comprising a pouch into which said luggage carrier is placed, said pouch being attached to said piece of luggage.

18. The combination of claim 14 wherein said luggage carrier is attached to a handle of said piece of luggage.

* * * * *